United States Patent [19]
Freeman

[11] Patent Number: 5,521,334
[45] Date of Patent: May 28, 1996

[54] MULTIPLE OVERLOAD PROTECTION FOR ELECTRONIC SCALES

[75] Inventor: Gerald C. Freeman, Norwalk, Conn.

[73] Assignee: Pitney Bowes Inc., Stamford, Conn.

[21] Appl. No.: 364,169

[22] Filed: Dec. 27, 1994

[51] Int. Cl.⁶ .......................... G01G 23/02; G01G 21/10
[52] U.S. Cl. .......................... 177/154; 177/184; 177/187; 177/189; 177/253; 177/264
[58] Field of Search .................... 177/154, 184, 177/155, 156, 157, 158, 159, 185, 186, 187, 188, 189, 253, 262

[56] References Cited

U.S. PATENT DOCUMENTS

| | | | |
|---|---|---|---|
| 4,237,988 | 12/1980 | Blawert et al. | 177/189 |
| 4,261,429 | 4/1981 | Lockery | 177/211 |
| 4,273,203 | 6/1981 | Blawert et al. | 177/187 |
| 4,278,139 | 7/1981 | Caris | 177/154 |
| 4,479,561 | 10/1984 | Feinland et al. | 177/154 |
| 4,574,898 | 3/1986 | Freeman | 177/154 |
| 4,726,435 | 2/1988 | Kitagawa et al. | 177/187 |
| 5,319,161 | 6/1994 | Miller et al. | 177/154 |

*Primary Examiner*—Peter S. Wong
*Assistant Examiner*—Randy W. Gibson
*Attorney, Agent, or Firm*—Robert H. Whisker; Melvin J. Scolnick

[57] ABSTRACT

An electronic scale is disclosed which has multiple overload protection features for protecting the load cell and a weight distribution plate from excessive strain due to vertical overload on the scale or from twisting resulting from an article being placed thereon which exceeds the load capacity of the scale, or from excessive forces due to mishandling of the scale. A first overload protection is in the form of a boss molded into the base of the scale on which the free end of the load cell abuts if an excessive load is placed on the platter of the scale. A second overload protection is in the form of a peripheral depending flange on the platter which abuts a peripheral portion of the a top cover to prevent excessive strain on the load cell and a weight distribution plate from excessive loading or mishandling of the scale. A third overload protection is in a plurality of ribs which are molded into the base and which extend upwardly adjacent the under surface of the four corners of the weight distribution plate so that the weight distribution plate abuts these ribs in the event that an excessive load is placed on the platter in an off center manner. The weight distribution plate is also provided with means for causing the weight of an article placed on the platter in an off center manner to be transferred to the point where the weight distribution plate is attached to the free end of the load cell so that an accurate weight is measured by the scale regardless of the placement of an article on the platter.

16 Claims, 3 Drawing Sheets

MULTIPLE OVERLOAD PROTECTION FOR ELECTRONIC SCALES

BACKGROUND OF THE INVENTION

The present invention relates generally to the field of electronic weighing scales, and more particularly to electronic scales designed particularly for use in weighing of mail pieces to determine the amount of postage required for mailing.

Postal weighing scales, i.e., scales designed particularly for use in weighing mail, have long been well known, and many varieties of such scales have been developed, both for general use such as in industry mail rooms and offices, and by the US Postal Service in post offices and mail distribution centers. These scales typically range in capacity from one pound to as much as 200 pounds, depending on whether a particular scale is used primarily for letter mail or for heavier mail or packages. Earlier versions of these scales utilized various forms of mechanical balancing devices so that a load placed on the scale platter would cause a mechanically operated weight indicator to register the weight of the load on a visible scale, or cause a balance arm to seek a midpoint when a load equal to the weight of the load on the platter was applied to the arm. These scales were highly successful in operation, for the most part, and met with a considerable degree of commercial success.

However, as in so many other forms of mechanical devices, the advantages of converting to electronic operating components became apparent. A principal factor involved in the conversion of postal scales from mechanical to electronic operating components was the fact that postal scales must have an extremely high degree of accuracy under virtually all operating conditions, and scales having electronic operating components were found to be consistently more accurate than those having mechanical operating component. The reason for the need for such high degree of accuracy is that postal scales are used for determining the amount of postage that must be applied to letter and small package mail, and to larger packages being mailed as parcel post, and even very slight inaccuracies in the weight given by a scale could potentially cause a serious loss of money, either for the mailer or for the USPS, depending on the manner in which the scale was inaccurate. This can be better appreciated when one considers the volume of the different types of mail handled by the Postal Service each year, which typically is in the billions of pieces.

One problem that arose with scales having electronic operating components is that the load cell, which is the heart of an electronic scale, is a highly delicate instrument and is subject to damage in the event that it is subjected to a load in excess of the load for which it is designed. Basically, a load cell using strain gage technology can be a generally rectangular metallic body member which is adapted to have one end rigidly mounted on a frame so that the load cell is supported only at that end, with the rest of the body member being cantilevered from the mounting end. The other end of the body member is provided with some means for supporting a weight. Strain gages are mounted on the body member in appropriate locations that very slightly when the body member is deflected by the application of the weight. An electric voltage is applied across the strain gage which varies in accordance with the extent to which the strip is strained by the weight on the free end of the body member. Generally, there are several strain gages located at appropriate locations that allow them to be connected in the form of a Wheatstone Bridge, which is well known in the art. By suitable electronic devices also well known in the art, variations in the voltage across the bridge circuit metallic strip resulting from different weights applied to the free end of the body member can be read as different weights on various forms of digital readout devices.

One of the major advantages of the load cell as a measuring device for use in postal scales is that it is extremely accurate, permitting scale readings to within one part in 3000 to 5000 on a five pound scale. There is, however, a tradeoff in that the accuracy of the load cell is dependent upon a very sensitive construction that is easily damaged with overload. The problem is that with a typical load cell, the deflection of the free end of the cell is extremely small, in the order of ten thousandths of an inch, and if the load cell is deflected much beyond that amount, the bond of the strain gage to the base metal or the base material that stretches in response to deflection of the body member is permanently damaged, rendering the load cell useless. Thus, it is very important to provide a scale having a load cell control component with suitable means for preventing the load cell from being subjected to an excessive load, such as would occur if a user placed a load on the scale platter which exceeded the maximum weight for which the scale is rated, or possibly mishandled the scale in such a manner that a momentary impact on the scale platter caused the overload.

In the prior electronic postal scales over which the scale of this invention represents an improvement, as represented by the scale shown in U.S. Pat. No. 5,072,799, issued on Dec. 17, 1991 to Freeman et al., and assigned to the assignee of this application, the load cell is mounted between a pair of identical cast metal body members, each of which has a central portion to which opposite ends of the load cell are connected. Each of the body members also has a plurality or legs extending radially outwardly, those from the lower body member supporting the assembly of the body members and the load cell in a suitable frame or housing, and those from the upper body member providing a suitable weight distribution plate for supporting the scale platter, thereby supporting the scale platter adjacent the four corners thereof. The load cell is protected against overload by an adjustable center downstop which includes a pair of downstop set screws which seat against a metal surface, such as the head of a bolt, and a controlled gap at the corners due to machining portions of the castings at each of the corners.

Because of the particular use of the scale, i.e., to indicate the amount of postage required for mailing, the adjustability of the downstop had to be very critical, typically being in the range of 8 to 30 thousandths of an inch, with an adjustment tolerance of plus or minus one thousandth. As previously indicated, the actual deflection of the free end of a load cell is very small, and it was found, in the case of the cast metal body members of the previous scales, that the machining tolerances on the castings would not permit variations in the position of a load cell downstop to plus or minus one thousandths of an inch, particularly when there are two different components that are involved in the tolerance buildup. The height of the load cell, plus the tolerance of the machining of both surfaces of the downstop and the load cell mount on each of the two cast body members all contribute to rendering such a small variation in adjustability of the downstop virtually impossible without an adjustable downstop. Thus, the adjustable center downstop was required. Adjustable corner downstops were not required because the gap required between the ends of the legs of the case body members was much larger at the corners than was the deflection of the free end of the load cell, in the order of 100 to 125 thousandths of an inch, plus or minus 5 thousandths. Therefore, these portions of the cast body members could be machined to produce the required tolerance variations.

It should be understood that, while case metal body members with carefully machined parts and very accurate adjustable center downstops are well suited to the manufacture of a substantially large scale, such as would be used for weighing packages up to 200 pounds, this type of construction is too costly for smaller scales, such as five pound capacity scales that are used primarily to weigh letter mail, which renders them relatively noncompetitive. Thus, the need was recognized for an entirely different form of weight distribution plate and overload protection system for small capacity scales. The present invention accomplishes these objectives, as described in detail hereinafter, by eliminating the cast metal body members and also the adjustable center downstop, thereby greatly reducing the mechanical complexity of the scale, the cost of manufacturing, and the need for critical adjustment of movable parts.

BRIEF SUMMARY OF THE INVENTION

The present invention provides multiple overload protection features for certain critical components of the scale, specifically the load cell and the weight distribution plate, which at last minimizes if not altogether eliminates the possibility of serious damage to these parts. One aspect of the invention is directed toward protecting the load cell against excessive strain resulting from central vertical loading on the scale platter. Another aspect is directed toward protecting the load cell and the weight distribution plate against excessive strain resulting from off-center loading of the scale platter. A third aspect is directed toward protecting the load cell and the weight distribution plate from excessive strain resulting from shock to these parts caused by the scale being dropped during shipment or use, or from other mishandling. A significant feature of the invention is the design of a weight distribution plate that transfers the weight of an article being weighed at the point where the scale platter supporting the article is connected to the load cell so that off-center loading of the platter has no detrimental effect on the load cell. A further feature of the present invention is the provision of means for protecting the weight distribution plate against any undue twisting force while removing the platter from the scale in the event that an operator uses excessive force in disconnecting the platter from the means that normally secures it to the scale.

In its broader aspects, the present invention is an electronic weighing scale having multiple overload protection features for protecting certain components of the scale against excessive strain. The electronic scale comprises a generally rectangular housing having a bottom wall and a plurality of upstanding side walls, an elongate load cell having one end thereof fixedly mounted on a portion of the bottom wall, a top cover having planar dimensions closely approximating those of the housing and fixedly secured thereto, a weight distribution plate having planar dimensions closely approximating those of the housing and fixedly mounted on the free end of the load cell, and a platter supported on the weight distribution plate. Finally, there is a plurality of abutment means for preventing excessive strain on the load cell and on the weight distribution plate, with the result that the load cell and said weight distribution member are protected against damage from excessive strain imposed on said load cell and said weight distribution plate from excessive central loading of said platter, from excessive off center loading of said platter and from shock due to mishandling.

In some of its more limited aspects, there is a first abutment means disposed on the housing for preventing downward movement of the free end of the load cell beyond a predetermined limited established for the load cell which comprises a raised boss disposed on a portion of the bottom wall in underlying relation to the free end of the load cell and forms a limit beyond which the free end of the load cell cannot be depressed.

There is a second abutment means for preventing downward movement of the platter beyond a predetermined limit set for the platter, which comprises a depending peripheral flange surrounding the platter in overlying relationship to a peripheral portion of the upper surface of the top cover, the lower edge of the flange being disposed in closely adjacent spaced relationship with the upper surface of the top cover and constituting a predetermined limit beyond which the platter cannot be depressed.

And there is a third abutment means for preventing downward movement of the weight distribution plate beyond a predetermined limit set for the weight distribution plate which comprises a plurality of upstanding abutment members disposed adjacent the four corners of the housing, and having upper edges disposed in closely spaced underlying relationship with the four corners of the weight distribution plate and which constitute a predetermined limit beyond which the corners of the weight distribution plate cannot be depressed.

Finally, there is an abutment means disposed on the underside of the top cover in overlying relationship to the four corners of the weight distribution plate against which the corners of the weight distribution plate bear while removing the platter from the scale in the event that the platter does not easily disengage from the weight distribution plate and tends to draw it upwardly.

Further, a feature of the invention is the design of the weight distribution plate which includes means for changing the resistance to bending of one end thereof with respect to the other end thereof to compensate for the difference in resistance to bending of opposite ends of the weight distribution plate which result from the weight distribution plate being connected to the free end of the load cell in an off center manner. This comprises a plurality of slots formed in the weight distribution plate which extend from the end thereof adjacent the point of connection of the weight distribution plate to the free end of the load cell toward the center of the weight distribution plate for a distance sufficient to reduce the resistance to bending of that end of the weight distribution plate so that it is equal to the resistance to bending at the other end thereof.

Having described the general nature of the present invention, it is a principle object thereof to provide a multiple overload protection system for an electronic scale having multiple overload protection features for protecting certain critical components of the scale from excessive strain.

Another object of the present invention is to an electronic scale in which the weight distribution plate cannot be damaged due to excessive strain imposed on it during removal of the platter from the scale.

It is another object of the present invention to provide an electronic scale in which the weight of an article is transferred at the point where the weight distribution plate supporting the platter is connected to the load cell so that off-center loading of the platter has no detrimental effect on the load cell.

It is a still further object of the present invention to provide an electronic scale in which the expensive cast metal body members and also the adjustable center downstops are eliminated, thereby greatly reducing the mechanical complexity of the scale, the cost of manufacturing, and the need for critical adjustment of movable parts.

These and other objects and advantages of the present invention will be more apparent from an understanding of the following detailed description of a presently preferred embodiment of the present invention when considered in conjunction with the accompanying drawings.

DETAILED DESCRIPTION OF THE INVENTION

Figure 1:
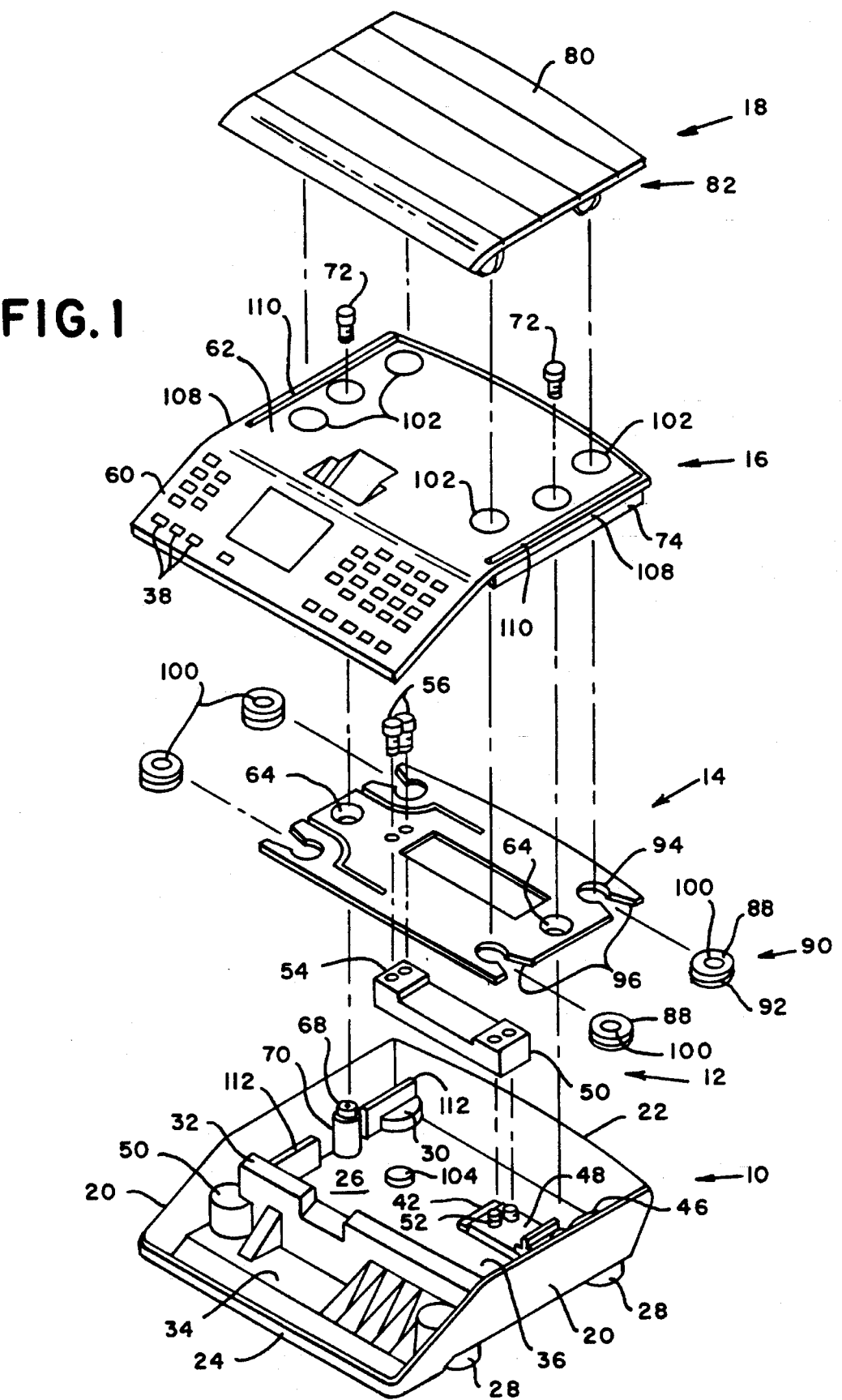
FIG. 1 is an exploded, perspective view of the major components of the electronic scale of the present invention.

Referring now to the drawings, and more particularly to FIG. 1 thereof, the major components of the scale of the present invention are shown in an exploded manner, and are seen to comprise a housing, indicated generally by the reference numeral 10, a load cell, indicated generally by the reference numeral 12, a weight distribution plate, indicated generally by the reference numeral 14, a top cover, indicated generally by the reference numeral 16, and finally a platter, indicated generally by the reference numeral 18, on which the mail piece to be weighed is placed.

With reference, now, to all of the figures, it will be seen that the housing 10 is generally rectangular and has oppositely disposed upstanding side walls 20, an upstanding rear wall 22, a very short, upstanding front wall 24, and a bottom wall 26 to which the side, rear and front walls are connected. A plurality of feet 28 are suitably connected to the underside of the bottom wall 26 in recesses defined by wall portions 30 (see FIGS. 1 and 3) for supporting the scale. The housing 10, as well as the top cover 16 and the platter 18, in this instance are formed of injection molded polycarbonate blend plastic, although other types of plastic blends with similar characteristics are available. An upstanding wall 32 extends across the housing 10 between the side walls 20 to divide the space within the housing 10 into forward and rearward compartments 34 and 36, the former for the electronic components which are actuated by a plurality of push buttons that extend through suitable openings 38 formed in the top cover 16, the latter for the load cell 12 and other electronic components that will not fit in the forward compartment 34.

Figure 2:
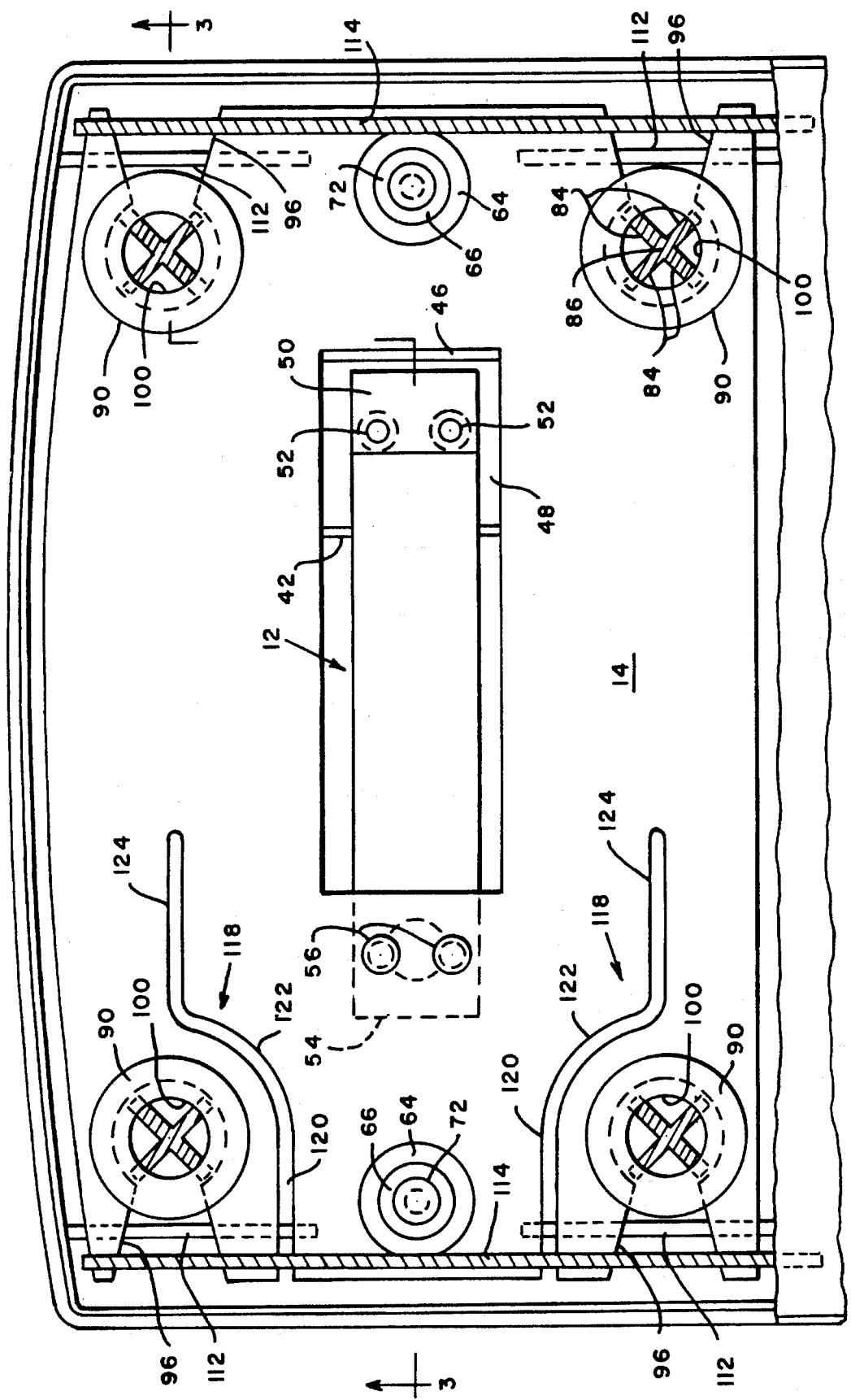
FIG. 2 is a plan view, partly in section, looking downwardly at the weight distribution plate of the electronic scale of the present invention taken on the line 2—2 of FIG. 3.

As best seen in FIGS. 1 and 2, the bottom wall 26 is provided with a recess 40 located adjacent to one of the side walls 20, and which is bounded by an elongate upstanding boss 42 on the laterally inward side of the recess and an overlapping laterally extending flange 44 on another elongate upstanding boss 46 formed on the opposite side of the recess 40. A metal support plate 48 is disposed in the recess 40 and is held in place by the overlapping flange 44. A fixed end 50 of the load cell 12 is positioned on the support plate 48 and is connected to the base and housing member 10 by suitable screws 52 which pass through openings in the bottom wall 26 and the support plate 48 and threadedly engage the fixed end 50 of the load cell 12. The opposite or free end 54 of the load cell 12 is connected to the weight distribution plate 14 by means of similar screws 56 which pass through openings in the plate 14 and are threadedly engaged with the free end 54 of the load cell 12. It should be noted that the connection of the weight distribution plate 14 to the free end 54 of the load cell 12 is the only means by which the weight distribution plate 14 is mounted within the base and housing member 10. Further details of the weight distribution plate will be fully explained below.

Figure 3:
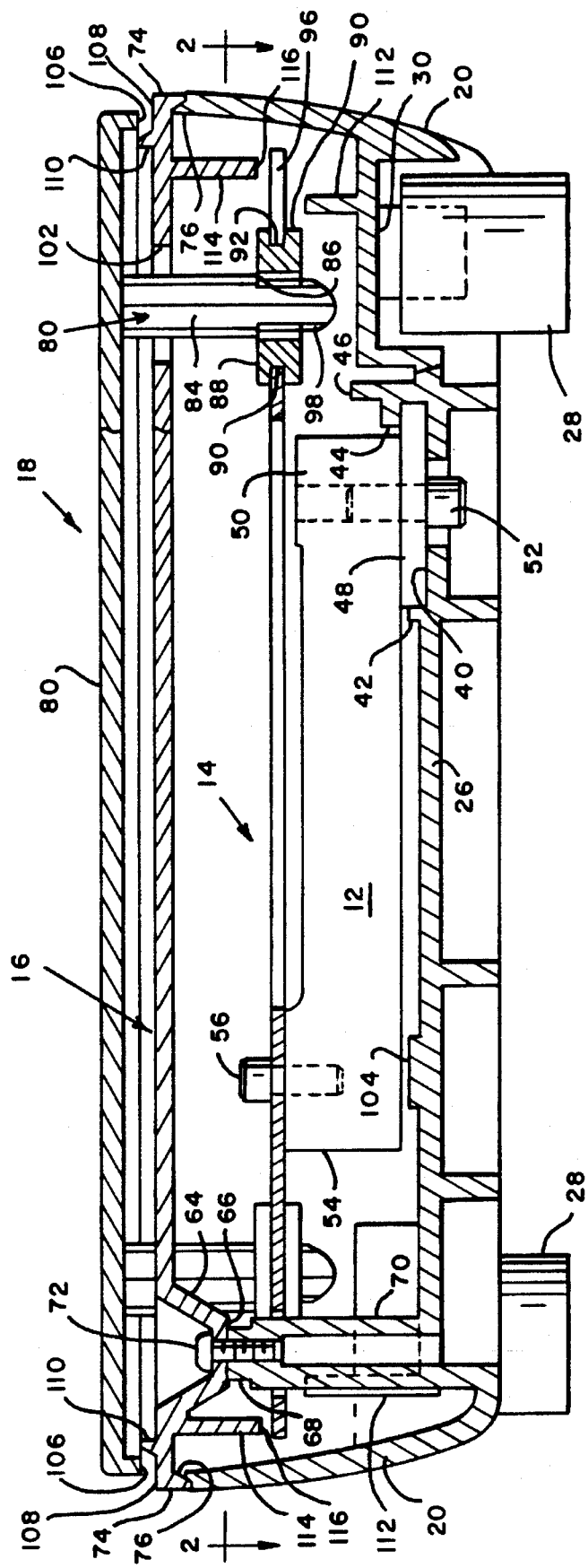
FIG. 3 is a side sectional view through the assembled electronic scale of the present invention, taken on the line 3—3 of FIG. 2.

The top cover 16 is dimensioned to overlie the housing 10, and includes a push button access portion 60 which includes the aforementioned button access openings 38 and overlies the forward compartment 34 in the base and housing member 10. The remainder of the top cover 16 is a generally rectangular portion 62 which overlies the rearward compartment 36 in the housing 10. The rectangular portion 60 includes a pair of downwardly extending protrusions 64 (only one of which is seen in FIG. 3 due to the change in direction of the section line 3—3 in FIG. 2), each of which has a mounting annulus 66 which rests on top of a boss 68 located on the end of an upwardly extending cylindrical post 70 formed integrally with the bottom wall 26. A screw 72 passes through each annulus 66 and is threadably engaged with the upper end of each post 70 to secure the top plate 16 to the housing 10. As best seen in FIGS. 1 and 3, the top cover 16 has a peripheral, downwardly extending flange 74 that engages with a peripheral upwardly extending flange 76 formed on the upper edges of the side walls 20 and rear wall 22 to ensure that the top cover 16 is firmly seated on the housing 10.

The scale platter 18 is basically a generally rectangular body member 80 which has approximately the same dimensions as the rectangular portion 62 of the top cover, and is provided with four identical legs, one of which is indicated generally by the reference numeral 82 in FIG. 1. Each leg 82 has a plurality of webs 84 radiating outwardly from a central point of intersection 86 (see FIG. 3), which extend downwardly from the underside of the body member 80. In the embodiment disclosed, each leg 82 has four webs 84, although this number can vary. The webs 84 terminate downwardly in spaced relationship to the underside of the body member 80 to define a plurality of supporting surfaces 86 which rest on the upper surface 88 of a grommet, indicated generally by the reference numeral 90 in FIG. 1. As seen in FIGS. 1 and 3, there are four such grommets, each having a peripheral slot 92 which engage with the inner circular edges of apertures 94 formed in the weight distribution plate 14. The grommets 90 are positioned in the apertures 94 by being inserted into the open throats 96 of the apertures 94, the grommets 90 having sufficient resilience to distort inwardly while being inserted through the throats 96 and then expending to seat firmly in the apertures 94. As best seen in FIG. 3, the webs 84 of the legs 82 have a reduced diameter portion 98 which projects through an aperture 100 in each of the grommets, the lateral projection of the webs 98 and the inner diameter of the apertures 100 being selected such that the webs 98 are gripped by the inner edges of the apertures 100 with sufficient strength to firmly retain the platter 18 on the weight distribution plate 14, but not so tightly that it cannot be readily removed by a user simply by lifting the platter upwardly. It should be noted that the top cover 16 is provided with openings 102 which are sufficiently large to enable the webs 84 to pass therethrough without the webs 84 touching the inner edges of the apertures 102 so that the platter 18 is supported solely by the weight distribution plate 14.

As previously mentioned, the present invention provides multiple overload protection features for the scale which are intended to at least minimize if not entirely eliminate the possibility of damage either to the load cell 12 or to the weight distribution plate 14, either from overloading the scale in the course of normal use or from various forms of mishandling during shipment or at the location of use. The overload protection features of the present invention comprise a series of abutment means built into the scale, a first of which prevents downward movement of the free end 54 of the load cell 12 beyond a predetermined limit established for the load cell 12. A second abutment means prevents downward movement of the corners of the platter 18 beyond a predetermined limit set for the corners of the platter 18. And a third abutment means prevents downward movement of the corners of the weight distribution plate 14 beyond a predetermined limit set for the corners of the weight distribution plate 14.

Thus, as seen in FIGS. 1 and 3, the first of the abutment means comprises an upstanding boss 104 that is molded into the bottom wall 26 beneath the load cell 12 and adjacent the free end 54 thereof, the purpose of the boss 104 being to prevent further downward deflection of the free end 54 of the load cell 12 after the maximum load for which the scale is designed has been reached. Since the boss 104 is fixed relative to the scale, it represents a predetermined limit beyond which the free end 54 of the load cell 12 cannot be depressed, thereby prevent damage to the load cell 12 from excessive strain being applied to the delicate strain gages bonded to the load cell 12. As previously mentioned, the deflection of the load cell 12 is very slight, being in the order of 0.015 thousandths of an inch, plus or minus one thousandths, for a five pound scale. In actual practice, the capacity of the load cell for a particular scale can be selected at about twice the weighing capacity of the scale in order to more easily accommodate off-center loading of the platter 18, and to allow for more freedom in the design of the center and corner overload protection features.

The second of the overload protection abutment means comprises a depending flange 106 which surrounds the platter 18 on the four sides thereof, and a peripheral portion 108 of the upper surface of the top cover 16 which lies outside of an upstanding rib 110 which surrounds the top cover on three sides thereof. As best seen in FIG. 3, when the platter 18 is properly positioned on the scale, there is a gap of approximately 0.130 inches between the under surface of the flange 106 and the upper surface of the peripheral portion 108 of the top cover 16. It will be apparent that, since the upper surface of the peripheral portion 108 of the top cover is also fixed relative to the scale, it represents a predetermined limit beyond which the lower surface of the corners of the flange 106 cannot be depressed, thereby preventing torsional damage to the load cell in the same manner as that set forth above with regard to the raised boss 104 preventing a vertical overload, and also preventing damage to the weight distribution plate 14 by preventing excessive strain on the weight distribution plate 14.

The third of the overload protection abutment means comprises a plurality of upstanding ribs 112 which are located approximately in the four corners of the housing 10, as seen in FIG. 3. The upper edges of the ribs 112 are normally disposed in spaced relationship with the underside of the weight distribution plate 14 adjacent the portions thereof that define the throats 96 at the four corners of the weight distribution plate 14.

Again, it will be apparent that, since the ribs 112 are also fixed relative to the scale, they represent a predetermined limit beyond which the corners of the weight distribution plate 14 cannot be depressed, thereby preventing damage thereto from excessive twisting strain on the weight distribution plate 14 and excessive torque on the load cell.

Referring to FIGS. 2 and 3, a means of protection is provided to prevent excessive strain from being imposed on the weight distribution plate 14 and the load cell 12 while the platter 18 is being removed from the scale. As previously described, the platter 18 is attached to the scale by the reduced diameter portion 98 of the legs 82 passing through the apertures 100 in the grommets 90, with the bottom surfaces 86 of the webs 84 resting on the upper surfaces 88 of the grommets 90. With this arrangement, if one of the grommets 90 grips a leg 82 of the platter 18 too tightly and the platter 18 is removed from the scale, the corner of the weight distribution plate 14 where that grommet is located will be twisted upwardly, thereby imposing an excessive twisting strain on the weight distribution plate 14. To prevent this from occurring a pair of downwardly extending ribs 114 are disposed on the underside of the top cover 16 adjacent the side edges thereof, the bottom edges 116 being disposed in closely spaced relationship with the upper surface of the corners of the weight distribution plate 14. It will again be seen that since the ribs 116 are affixed to the top cover 116 and are therefore fixed relative to the scale, they constitute a predetermined limit beyond which the corners of the weight distribution plate 14 cannot be moved upwardly, thereby preventing damage to the weight distribution plate 14 and the load cell 12 from excessive twisting strain on the weight distribution plate during removal of the platter 18 from the scale.

A feature of the present invention resides in the design of the weight distribution plate 14, which transfers the full weight of an article on the platter to the point at which the weight distribution plate 14 is fixedly mounted on the free end 54 of the load cell 12, regardless of where the article is placed on the platter. The weight distribution plate 14 includes a means for changing the resistance to bending of one end thereof with respect to the other end thereof to compensate for the difference in resistance to bending of opposite ends of the weight distribution plate which result from the weight distribution plate being connected to the free end 54 of the load cell 12 in an off center manner, as clearly seen in FIGS. 1 and 3. The result is that the peripheral flange 106 on the platter 18 will abut the peripheral portion 108 of the upper surface of the top cover 16 when the maximum load for which the scale is rated is placed anywhere around the periphery of the platter 18, as described above for the second overload protection feature.

Thus, as best seen in FIG. 2, the weight distribution plate 14 is provided with a pair of slots designated generally by the reference numeral 118 adjacent the corners of the plate that are proximate the free end 54 of the load cell 12 to which the weight distribution plate 14 is connected. The slots 118 have first straight portions 120 which merge into curved portions 122, which then extend one quarter the distance around the grommets 90, and then merge into second straight portions 124 which extend for approximately the same length as the first straight portions 120. The specific configuration of the slots 118 causes the weight distribution plate 14 to yield more readily to the bending force of a weight on the periphery of the platter 18 adjacent the point of connection of the weight distribution plate 14 to the load cell 12 than it would to the weight so placed adjacent the opposite end of the weight distribution plate. The reason for this is that the point of connection of the weight distribution plate 14 to the load cell 12 is off center with respect to the weight distribution plate, with the result that a weight on the platter 18 adjacent that end of the weight distribution plate 14 will exert a smaller bending force on the weight distribution plate 14 at the point of connection to the load cell 12 due to the shorter bending arm. On the other hand, a weight on the platter 118 adjacent the other end of the weight distribution plate 14 will exert a larger bending force on the weight distribution plate 14 at the connection point due to the much longer bending arm. The slots 118 compensate for the differences in the bending arms in the weight distribution plate 14 regardless of where the weight is placed on the platter 18 by, in effect, "softening" the weight distribution plate 14 on the side near the point of connection to the load cell 12 so that it exerts less resistance to bending.

While it is not necessary to go through a theoretical analysis of the formulas for determining the specific shape of the slots shown in the embodiment of the invention illustrated and described herein in order to fully understand the invention, it nevertheless should be understood that the shape of the slots is calculated to offset variations in the degree of deflection of the platter at the four corners thereof resulting from sources of deflection other than the weight distribution plate 14. For example, it has been found that the housing 10 permits a certain amount of deflection of the platter 18 at the four corners thereof due to the inherent deflection of the load cell 12 where it is connected to the housing 10. The load cell 12 also permits a certain amount of deflection of the platter 18 at the four corners thereof due to the inherent deflection of the load cell 12 along its length between the point where it is connected to the housing 10 and the point where the weight distribution plate 14 is connected to the load cell 12 itself has an inherent degree of deflection. In order for the second overload protection feature to be effective, the bottom of the flange 106 should bottom out on the upper surface 108 of the top cover when the maximum load for which the scale is rated (e.g., 5#) is placed anywhere around the periphery of the platter 18. Since the known degrees of deflection at the corners of the platter resulting from the housing 10 and the load cell 12 are known from careful measurement, and are different at opposite ends of the weight distribution plate, by appropriate formulae the shape of the slots 118 can be calculated so make the total deflection of the platter 18 at the four corners thereof equal.

As an example of the foregoing, in the case of the 5# scale disclosed herein, the normal gap between the underside of the flange 106 and the adjacent upper surface 108 of the top cover 16 is about 0.125". The housing deflection at the two corners of the platter 18 adjacent the point of connection of the weight distribution plate 14 to the load cell 12 has been found to be 0.020 inches at each corner, and the load cell deflection at the same corners has been found to be 0.014". Thus, the deflection of the weight distribution plate 14 at these corners must be 0.091" in order to provide a total deflection of the platter 18 at these corners of 0.125". At the opposite corners, however, the housing deflection has been found to be 0.005" and the load cell deflection 0.010". Thus, the deflection of the weight distribution plate at these corners must be 0.110" in order to provide the same total deflection to the platter 18. Thus, it should now be clear that the specific shape of the slots 118 provide the necessary degree of "softening" of the weight distribution plate 14 so that it provides a lesser degree of deflection at the corners adjacent to the point of connection of the weight distribution plate 14 to the load cell than it does at the opposite corners.

It is to be understood that the present invention is not to be considered as limited to the specific embodiment described above and shown in the accompanying drawings, which is merely illustrative of the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

What is claimed is:

1. An electronic weighing scale having multiple overload protection features for protecting certain components of the scale against excessive strain, said electronic scale comprising:

(a) a generally rectangular housing having a bottom wall and a plurality of upstanding side walls;

(b) an elongate load cell having one end thereof fixedly mounted on a portion of said bottom wall;

(c) a top cover having planar dimensions closely approximating planar dimensions of said housing and fixedly secured thereto;

(d) a weight distribution plate having planar dimensions closely approximating planar dimensions of said housing and fixedly mounted on the free end of said load cell, and comprising means for changing resistance to bending of an end of said weight distribution plate, said means for changing resistance comprising a pair of slots formed in said weight distribution plate and adjacent the corners of said end of said weight distribution plate, and further for protection against strain placed upon said weight distribution plate by changing resistance;

(e) a platter supported on said weight distribution plate; and (f) a plurality of abutment means for preventing excessive strain on said load cell and said weight distribution plate, whereby said load cell and said weight distribution plate are protected against damage from excessive strain imposed on said load cell and said weight distribution plate from excessive central loading of said platter, from excessive off-center loading of said platter, and from shock due to mishandling.

2. An electronic weighing scale as set forth in claim 1 wherein a first of said plurality of abutment means comprises abutment means disposed on said housing for preventing downward movement of said free end of said load cell beyond a predetermined limit established for said load cell.

3. An electronic weighing scale as set forth in claim 2 wherein said first abutment means comprises a raised boss disposed on a portion of said bottom wall in underlying relation to the free end of said load cell, said boss forming a predetermined limit beyond which said free end of said load cell cannot be depressed.

4. An electronic weighing scale as set forth in claim 2 wherein a second of said plurality of abutment means comprises abutment means for preventing downward movement of said platter beyond a predetermined limit set for said platter.

5. An electronic weighing scale as set forth in claim 4 wherein said second abutment means comprises a depending peripheral flange surrounding said platter in overlying relationship to a peripheral portion of the upper surface of said top cover, the lower edge of said flange being disposed in closely adjacent spaced relationship with said upper surface of said top cover, said upper surface of said top cover constituting a predetermined limit beyond which said platter cannot be depressed.

6. An electronic weighing scale as set forth in claim 4 wherein a third of said plurality of abutment means comprises abutment means for preventing downward movement of said weight distribution plate beyond a predetermined limit set for said weight distribution plate.

7. An electronic weighing scale as set forth in claim 6 wherein said third abutment means comprises a plurality of upstanding abutment members disposed adjacent the four corners of said housing, said abutment members having upper edges disposed in closely spaced underlying relationship with the four corners of said weight distribution plate, said upper edges of said upstanding abutment members constituting a predetermined limit beyond which said corners of said weight distribution plate cannot be depressed.

8. An electronic weighing scale as set forth in claim 1 wherein said plurality of abutment means comprises
   A. first abutment means disposed on said housing for preventing downward movement of said free end of said load cell beyond a predetermined limit established for said load cell,
   B. second abutment means for preventing downward movement of said platter beyond a predetermined limit set for said platter, and
   C. third abutment means for preventing downward movement of said weight distribution plate beyond a predetermined limit set for said weight distribution plate.

9. An electronic weighing scale as set forth in claim 8 wherein said first abutment means comprises a raised boss disposed on a portion of said bottom wall in underlying relation to the free end of said load cell, said boss forming a predetermined limit beyond which said free end of said load cell cannot be depressed.

10. An electronic weighing scale as set forth in claim 8 wherein said second abutment means comprises a depending peripheral flange surrounding said platter in overlying relationship to a peripheral portion of the upper surface of said top cover, the lower edge of said flange being disposed in closely adjacent spaced relationship with said upper surface of said top cover, said upper surface of said top cover constituting a predetermined limit beyond which said platter cannot be depressed.

11. An electronic scale as set forth in claim 8 wherein said third abutment means comprises a plurality of upstanding abutment members disposed adjacent the four corners of said housing, said abutment members having upper edges disposed in closely spaced underlying relationship with the four corners of said weight distribution plate, said upper edges of said upstanding abutment members constituting a predetermined limit beyond which said corners of said weight distribution plate cannot be depressed.

12. An electronic scale as set forth in claim 1 further including abutment means disposed on the underside of said top cover adjacent the side edges thereof, said abutment means having lowermost portions disposed in closely spaced relationship with the upper surface of the four corners of said weight distribution plate, said lowermost portions of said abutment means constituting a predetermined limit beyond which said corners of said weight distribution plate cannot be bent upwardly during removal of said platter from said scale.

13. An electronic scale as set forth in claim 2, wherein:
   (a) a second of said plurality of abutment means comprises abutment means for preventing downward movement of said platter beyond a predetermined limit set for said platter; and
   (b) said weight distribution plate comprises means for causing said second abutment means to stop the downward movement of said platter when the maximum weight for which said scale is rated is placed anywhere around the periphery of said platter.

14. An electronic scale as set forth in claim 13:
   A. wherein said second abutment means comprises a depending peripheral flange surrounding said platter in overlying relationship to a peripheral portion of the upper surface of said top cover, the lower edge of said flange being disposed in closely adjacent spaced relationship with said upper surface of said top cover, said upper surface of said top cover constituting a predetermined limit beyond which said platter cannot be depressed,
   B. wherein said weight distribution plate is mounted on said free end of said load cell at a point on said weight distribution plate that is closer to one end thereof than the other, and
   C. wherein said means for causing said second abutment means to stop the downward movement of said platter comprises means for changing the resistance to bending of said one end of said weight distribution plate with respect to the other end thereof to cause said lower edge of said flange to abut said upper surface of said top cover when the maximum weight for which said scale is rated is placed anywhere around the periphery of said platter.

15. An electronic scale as set forth in claim 14 wherein said means for changing the resistance to bending of said one end of said weight distribution plate comprises a pair of slots formed in said weight distribution plate adjacent the corners of said one end thereof.

16. An electronic scale as set forth in claim 15 wherein said slots are elongate and extend from the edge of said one end of weight distribution plate toward the center thereof for a distance sufficient to reduce the resistance to bending of said one end of said weight distribution plate so that it is equal to the resistance to bending of said other end thereof.

* * * * *